United States Patent [19]

Yanus et al.

[11] Patent Number: 4,665,231
[45] Date of Patent: May 12, 1987

[54] PROCESS FOR PREPARING SQUARAINES

[75] Inventors: John F. Yanus, Webster; William W. Limburg, Penfield, both of N.Y.

[73] Assignee: Xerox Corporation, Stamford, Conn.

[21] Appl. No.: 858,627

[22] Filed: May 2, 1986

[51] Int. Cl.[4] .................. C07C 85/00; C07C 85/02; C07C 85/06
[52] U.S. Cl. .................................................. 564/307
[58] Field of Search ........................................ 564/307

[56] References Cited

U.S. PATENT DOCUMENTS

| | | | |
|---|---|---|---|
| 4,490,452 | 12/1985 | Champ et al. | 430/58 |
| 4,521,621 | 6/1985 | Yanus et al. | 564/307 |
| 4,523,035 | 6/1985 | Yanus | 564/307 |
| 4,524,218 | 6/1985 | Branyi et al. | 564/307 |
| 4,524,219 | 6/1985 | Law | 564/307 |
| 4,524,220 | 6/1985 | Law | 564/307 |
| 4,525,592 | 6/1985 | Law et al. | 564/307 |
| 4,552,822 | 11/1985 | Kazmaier et al. | 564/307 X |
| 4,585,884 | 4/1986 | Lin et al. | 564/307 X |
| 4,585,895 | 4/1986 | Law | 564/307 |

Primary Examiner—Paul F. Shaver
Attorney, Agent, or Firm—Peter H. Kondo

[57] ABSTRACT

A process for forming finely divided squaraine particles is disclosed comprising dissolving squaraine material in an organic base selected from the group consisting of primary organic amines and secondary organic amines, neutralizing the organic base with an acid selected from the group consisting of organic acids and inorganic acids thereby precipitating the squaraine material as finely divided particles in a liquid medium, and separating the finely divided particles from the liquid medium.

11 Claims, No Drawings

4,665,231

PROCESS FOR PREPARING SQUARAINES

BACKGROUND OF THE INVENTION

This invention relates in general to squaraines, and more specifically, to a process for preparing finely divided squaraine particles.

Squaraine compositions are useful for incorporation into photoresponsive devices to extend the response capability of such devices to visible light as well as infrared illumination. These photoresponsive devices can therefore be utilized, for example, in conventional electrophotographic copiers as well as in laser printers. These photoresponsive devices may comprise single or multilayered members containing photoconductive materials comprising squaraine compositions in a photogenerating layer, between a photogenerating layer and a hole transport layer, or between a photogenerating layer and a supporting substrate.

Photoconductive imaging members containing certain squaraine compositions, including amine derivatives of squaric acid, are known. Also known are layered photoresponsive devices containing photogenerating layers and transport layers, as described, for example in U.S. Pat. No. 4,123,27, U.S. Pat. No. 4,353,971, U.S. Pat. No. 3,838,095, and U.S. Pat. No. 3,824,099. Examples of photogenerating layer compositions disclosed in U.S. Pat. No. 4,123,270 include 2,4-bis-(2-methyl-4-dimethylamino-phenyl)-1,3-cyclobutadiene-diylium-1,3-diolate, 2,4-bis-(2-hydroxy-4-dimethylamino-phenyl)-1,3-cyclobutadiene-diylium-1,3-diolate, and 2,4-bis-(p-dimethylamino-phenyl)-1,3-cyclobutadiene-diylium-1,3-diolate. Still other photoconductive imaging members containing certain squaraine compositions are disclosed, for example, in U.S. Pat. No. 4,490,452.

The formation and development of electrostatic latent images on the imaging surface of photoconductive members by electrostatic means is well known. Generally, the method involves the formation of an electrostatic latent image on the surface of an electrophotographic plate, referred to in the art as a photoreceptor. This photoreceptor usually comprises a conductive substrate and one or more layers of photoconductive insulating material. A thin barrier layer may be interposed between the substrate and the photoconductive layer in order to prevent undesirable charge injection.

Many different photoconductive members are known including, for example, a homogeneous layer of a single material such as vitreous selenium, or a composite layered device containing a dispersion of a photoconductive composition. An example of one type of composite photoconductive member is described, for example, in U.S. Pat. No. 3,121,006. The composite photoconductive member of this patent comprises finely divided particles of a photoconductive inorganic compound dispersed in an electrically insulating organic resin binder. The photoconductive inorganic compound usually comprises zinc oxide particles uniformly dispersed in an electrically insulating organic resin binder coated on a paper backing. The binder materials disclosed in this patent comprise a material which is incapable of transporting for any significant distance injected charge carriers generated by the photoconductive particles. The photoconductive particles must therefore be in substantially contiguous particle to particle contact throughout the layer to permit the charge dissipation required for a cyclic operation. The uniform dispersion of photoconductive particles requires a relatively high volume concentration of photoconductive material, usually about 50 percent by volume, in order to obtain sufficient photoconductor particle to particle contact for rapid discharge. This high photoconductive particle loading can adversely affect the physical continuity of the resinous binder thereby significantly degrading the mechanical properties thereof. Specific binder materials disclosed in this patent include, for example, polycarbonate resins, polyester resins, polyamide resins, and the like.

Also known are photoreceptor materials comprising inorganic or organic materials wherein the charge carrier generating, and charge carrier transport functions are accomplished by discrete contiguous layers. Additionally, layered photoreceptor materials are disclosed in the prior art which include an overcoating layer of an electrically insulating polymeric material. However, the art of xerography continues to advance and more stringent demands need to be met by the electrostatographic imaging apparatus in order to improve performance, and to obtain higher quality images. Also desired are layered photoresponsive devices which are responsive to visible light and/or infrared illumination for certain laser printing applications.

Other layered photoresponsive devices including those comprising separate generating and transport layers are described, for example, in U.S. Pat. No. 4,265,990. Overcoated photoresponsive materials containing a hole injecting layer, overcoated with a hole transport layer, followed by an overcoating of a photogenerating layer, and an outer coating of an insulating organic resin are described, for example, in U.S. Pat. No. 4,251,612. Photogenerating layers disclosed in these patents include, for example, trigonal selenium and phthalocyanines and transport layers including certain diamines. The disclosure of U.S. Pat. Nos. 4,265,990 and 4,251,612 are incorporated herein by reference in their entirety.

In Belgium Pat. No. 763,540, an electrophotograhic member is disclosed having at least two electrically operative layers, the first layer comprising a photoconductive layer which is capable of photogenerating charge carriers and injecting the carriers into a continuous active layer containing an organic transporting material which is substantially non-absorbing in the spectral region of intended use, but which is active in that it allows the injection of photogenerated holes from the photoconductive layer and allows these holes to be transported through the active layer. Additionally, in U.S. Pat. No. 3,041,116, a photoconductive material is described containing a transparent plastic material overcoated on a layer of vitreous selenium contained on a substrate.

Squaraine pigments are an important group of infrared sensitive photoconductive pigments active in the GaAlAs solid state laser region (825 nm). Unsymmetrical squaraines usually have better electrical properties, but are difficult to prepare in small particle sizes. Large particles tend to cause defects in xerographic prints. Moreover, large particles do not adequately capture light efficiently and therefore require greater amounts in the binder layer. Difficulty in attaining small particle size unsymmetrical squaraine pigments also impacts pigment dispersion stability of the binder generator layer material. Pigments of unsymmetrical squaraines as synthesized, generally consist of crystals greater than about 20 μm. Efforts by ball-milling to reduce particle size to usable levels have failed. Attrited particle size reduction has been somewhat successful in reducing particle size but the resulting pigments exhibit an increased dark decay. Efforts to reprecipitate squaraines such as Bis(4-dimethylaminophenyl)-1,3-cyclobutadienediylium-1,3-diolate, Bis(2-fluoro-4-dimethylaminophenyl)-1,3-cyclobutadienediylium-1,3-diolate and physical mixtures of Bis(4-dimethylaminophenyl)-1,3-cyclobutadienediylium-1,3-diolate and Bis(2-methyl-4-dimethylaminophenyl)-1,3-cyclobutadienediylium-1,3-diolate (a methyl squaraine) have yielded pigments with unacceptable dark decay values. Also, "spoiled" batches of squaraines are a major concern in any scale-up operation for producing squaraines.

While photoresponsive devices containing the above-described known squaraine materials are suitable for their intended purposes, there continues to be a need for the development of an improved process for preparing finely divided squaraine materials which exhibit low dark decay and high sensitivity.

SUMMARY OF THE INVENTION

It is therefore an object of the present invention to provide improved processes for preparing squaraine compositions.

It is another object of the present invention, to provide improved an processes for preparing finely divided squaraine particles with enhanced low dark decay and high sensitivity.

It is yet another object of the present invention to provide a simpler, more rapid, more economical and higher yield process for preparing finely divided squaraine particles.

It is another object of the present invention, to provide improved processes for preparing finely divided squaraine particles having high infrared sensitivity for solid state laser addressed photoreceptor applications.

These and other objects of the present invention are accomplished dissolving squaraine material in an organic base selected from the group consisting of primary organic amines and secondary organic amines, neutralizing the organic base with an acid selected from the group consisting of organic acids and inorganic acids thereby precipitating the squaraine material as finely divided particles in a liquid medium, and separating the finely divided particles from the liquid medium.

Any suitable squaraine material may be utilized in the process of this invention. The squaraine material should be soluble in the base and not chemically react with the base. More specifically, the solubility should be at least 50 g/l at 20° C. and substantially chemically inert with respect to the base. Typical squaraine materials include phenol squaraines; 2-methyl squaraines; unsymmetrical squaraines such as 2-(4-dimethylaminophenyl)-4-(2-methyl-4-dimethylaminophenyl)-1,3-cyclobutadienediylium-1,3-diolate, 2-(4-dimethylaminophenyl)-4-(2-fluoro-4-dimethylaminophenyl)-1,3-cyclobutadienediylium-1,3-diolate, 2-(2-methyl-4-dimethylaminophenyl)-4-(2-fluoro-4-dimethylaminophenyl)-1,3-cyclobutadienediylium-1,3-diolate, 2-(2-fluoro-dimethylaminophenyl)-4-(3-fluoro-4-dimethylaminophenyl)-1,3-cyclobutadienediylium-1,3-diolate, 2-(methyl-4-dimethylaminophenyl)-4-(2-chloro-4-dimethylaminophenyl)-1,3-cyclobutadienediylium-1,3-diolate, and 2-(2-fluoro-4-dimethylaminophenyl)-4-(2-chloro-4-dimethylaminophenyl)-1,3-cyclobutadienediylium-1,3-diolate; Bis[4-(N-methyl-N-4-chlorophenylmethyl)aminophenyl]-1,3-cyclobutadienediylium-1,3-diolate; 2-[4-(N-methyl-N-4-chlorophenylmethyl)aminophenyl]-4-[dimethylaminophenyl]squaraine; 2-[4-(N-methyl-N-4-chlorophenylmethyl)aminophenyl]-4-[2-methyl-4-dimethylaminophenyl]squaraine; 2-[4-(N-methyl-N-4-chlorophenylmethyl)aminophenyl]-4-[2-fluoro-4-dimethylaminophenyl]squaraine; and the like. Squaraine materials and processors for preparing them are well known in the art. For example, in U.S. Pat. No. 4,521,621 to Yanus et al a process for synthesizing an unsymmetrical squaraine composition is described wherein a mixture comprising squaric acid, a long chain primary alcohol, a tertiary amine and an aromatic amine are heated to yield the unsymmetrical squaraine. In U.S. Pat. No. 4,524,220 to Law a process for the preparation of squaraine compositions is disclosed in which squaric acid is reacted with an aromatic aniline. The product exhibits reduced dark decay properties and increased charge acceptance values. In U.S. Pat. No. 4,525,592 to Law et al a process is disclosed for the preparation of squaraines. A dialkyl squarate is reacted with an aniline in the presence of an acid and an aliphatic alcohol to yield a squaraine. In U.S. Pat. No. 4,523,035 to Yanus a process for synthesizing squaraine compositions involves heating a mixture comprising squaric acid a long chain primary alcohol and a tertiary amine to yield a squaraine. In U.S. Pat. No. 4,524,218 to Branyi et al a process for the preparation of squaraine compositions is described wherein squaric acid, an aromatic amine and a phenol are reacted in the presence of an aliphatic alcohol to yield a squaraine. Amine derivatives of squaraic acid are also described in U.S. Pat. No. 4,123,270, U.S. Pat. No. 4,353,971, U.S. Pat. No. 3,838,095, and U.S. Pat. No. 3,824,099. In U.S. Pat. No. 4,524,219 to Law a process for the preparation of squaraines involves reacting an alkyl squarate with an aniline and an aliphatic alcohol to yield a squaraine. This reaction may take place in the presence of an acid catalyst. Specific unsymmetrical, fused ring, non-amine derivatives of squaric acid having hydroxy groups on a fused ring is disclosed in U.S. Pat. No. 4,353,971 and U.S. Pat. No. 3,824,099. The entire disclosures of U.S. Pat. Nos. 4,521,621; 4,524,220; 4,525,592; 4,523,035; 4,524,218; 4,123,270; 4,353,971; 3,838,095; 3,824,099; and 4,524,219 are incorporated herein by reference.

The squaraine particle sizes achieved from reaction mixtures for Bis(4-dimethylaminophenyl)-1,3-cyclobutadienediylium-1,3-diolate have been between about 10 and about 20 micrometers in length; for methyl squaraines, between about 25 micrometers and about 50 micrometers; and for unsymmetrical squaraines, from about 10 micrometers and about 30 micrometers. This compares to an average particles size of less than about 2 micrometers, e.g. between about 0.2 micrometer and about 2.0 micrometers using the process of this invention. Attempts to achieve small particle sizes from larger squaraine particles resulted in larger particle sizes due to multiplication and growth of particle or formation of layers. Ball milling normally produces a particle size of about 5 micrometers. Small particles sizes may be obtained by the use of attritors, but greater amounts of energy are required and a broad size distribution of particle size has been observed.

Any suitable organic base which dissolves the squaraine may be utilized. Typical bases include primary or secondary amines such as propylamine, butylamine, ethylenediamine, piperdine, pyrrolidine, diethylene triamine, and the like. A sufficient amount of base should be utilized to dissolve all of the squaraine material to eliminate the step of filtering any solid materials still present in the mixture. Excellent results have been achieved when about 20 grams of squaraine material is dissolved in about 100 grams of base. Generally, when the molar ratio of squaraine material to base approaches 1:1, amine adduct forms a precipitate. This precipitate is normally removed from the solution by filtering. Satisfactory results may also be achieved with, for example, 50 grams of squaraine material to about 100 grams of amine base. For maximum economy, the amount of base used to dissolve the squaraine material should sufficient to approach saturation of the solution. Although satisfactory results may be achieved with between about 10 percent by weight and about 50 percent by weight of squaraine based on the total weight of the solution, saturated solutions generally require relative weights of squaraine approaching 50 percent by weight of squaraine based on the total weight of the solution.

Any suitable acid may be utilized to neutralize the base utilized to dissolve the squaraine material. The neutralizing acid may be strong or weak. Typical neutralizing acids include acetic acid, hydrochloric acid, sulfuric acid, and the like.

Generally, satisfactory results may be achieved with a neutralizing end point between about pH 2 and about pH 10. Generally, at end points of greater than about pH 9 and less than about pH 2, the yield begins to decrease due to complexing. Thus, yields of about 80 percent are observed at end points between about pH 2 and about pH 10. An end point between about pH 2.5 and about pH 8 is preferred for yields approximation 100 percent.

The liquid in which the squaraine material is insoluble and which is present during neutralization, may be selected from any liquid in which the squaraine material is insoluble and which does not react with the squaraine material. In other words, the liquid is inert with respect to and does not dissolve the squaraine material. Typical liquids in which the squaraine material is insoluble include water, methanol, solvents that dissolve acids or bases, pyrrolidones, and water miscible solvents such as lower alcohols such as methanol, ethanol, propanol, isopropanol and butanol; acetone; dilute polymer solutions in water; and the like. Higher alcohols containing up to 12 carbon atoms can be useful.

The squaraine compositions prepared in accordance with the process of the present invention are useful as photoconductive substances. In one embodiment, they can be employed in a layered photoresponsive device comprising a supporting substrate, a photoconducting layer comprising the squaraine compositions prepared in accordance with the present invention, and a charge transport layer. In another embodiment, the photoresponsive device comprises a substrate, a charge transport layer, and a photoconducting layer comprising the squaraine compositions prepared in accordance with the process of the present invention. In still another embodiment, photoresponsive devices useful in printing systems be prepared in which the device comprise a layer of the squaraine photoconductive composition prepared in accordance with the process of the present invention positioned between a photogenerating layer and a hole transport layer or wherein the squaraine photoconductive squaraine composition layer is positioned between the photogenerating layer and a supporting substrate. In the latter device, the photoconductive layer comprising the squaraine compositions serves to enhance or reduce the intrinsic properties of the photogenerating layer in the infrared and/or visible range of the spectrum.

One specific improved photoresponsive device utilizing the squaraines prepared in accordance with the process of the present invention comprises a supporting substrate; a hole blocking layer; an optional adhesive interface layer; an inorganic photogenerator layer; a photoconductive composition layer comprising the squaraine materials prepared in accordance with the process of the present invention; and a hole transport layer.

The photoresponsive devices described can be prepared by any suitable well known method, the process parameters and the order of coating of the layers being dependent on the device desired. Thus, for example, a three layered photoresponsive device can be prepared by deposition of the photoconducting layer on a supporting substrate and subsequently depositing a charge transport layer. In another process variant, the layered photoresponsive device can be prepared by providing a conductive substrate having a blocking layer and an optional adhesive layer, and thereafter applying thereto a photoconducting layer. The photoconducting layer comprising the novel squaraines of the present invention as well as the transport layer can be formed by solvent coating processes, laminating processes, or other suitable processes.

The improved photoresponsive devices containing the squaraines made by the process of the present invention can be incorporated into various imaging systems such as conventional xerographic imaging copying and printing systems. Additionally, the improved photoresponsive devices containing an inorganic photogenerating layer and a photoconductive layer comprising the squaraines made by the process of the present invention can function simultaneously in imaging and printing systems with visible light and/or infrared light. In this embodiment, the photoreceptor devices may be negatively charged, exposed to light in a wavelength of from about 400 to about 1,000 nanometers, either sequentially or simultaneously, followed by developing the resulting image and transferring the image to paper. The above sequence may be repeated many times.

Exposure to illumination and erasure of the layered photoresponsive devices may be effected from either side of the devices or combinations thereof depending on the degree of transparency of any intervening layers between the source of activating radiation and the photoconductive layer. The charge transport layer may be positioned between the supporting substrate and the photoconductive layer. More specifically the photoresponsive device may comprise a supporting substrate, a hole transport layer comprising a hole transport composition dispersed in an inert resinous binder composition, and a photoconductive layer, comprising the novel squaraine compositions prepared by the process of the present invention alone or optionally dispersed in a resinous binder composition.

In summary, this invention describes a simple, high yield, cost effective method for producing fine particle size, low dark decay pigment irrespective of crude pigment properties having high infrared sensitivity for solid state laser addressed photoreceptor applications. Even "impurity" related high dark decay values can be eliminated by the process of this invention. Thus, "spoiled" batches of squaraines may be rendered usable thereby eliminating a major concern in any scale-up operation.

The invention will now be described in detail with reference to specific preferred embodiments thereof, it being understood that these examples are intended to be illustrative only. The invention is not intended to be limited to the materials, conditions, or process parameters recited herein. All parts and percentages are by weight unless otherwise indicated.

EXAMPLE I

Into a three liter three-necked round bottom flask equipped with a mechanical stirrer, thermometer and a condenser with a Dean-Stark trap was placed 28.5 grams squaric acid (0.25 mol), 80 grams N,N-dimethyl aniline (0.66 mole) and 1250 milliliters 1-heptanol. A vacuum of 25 torr was applied via the condenser. The mixture was heated with stirring to reflux at 95° C. The water formed during the course of the reaction was allowed to collect in the Dean-Stark trap. After 24 hours, the reaction was allowed to cool and was filtered. The resulting blue crystalline pigment was washed with methanol and dried in vacuo at 50° C. Yield of bis(4-dimethylainophenyl)squaraine was 55 grams (69 percent). Twenty grams of this Bis(4-dimethylaminophenyl)squaraine pigment having a rod shape and a particle size ranging from 0.5 μm 15 μm was added to a flask containing 50 grams of ethylene diamine purged with argon. An amine adduct believed to have the following structure:

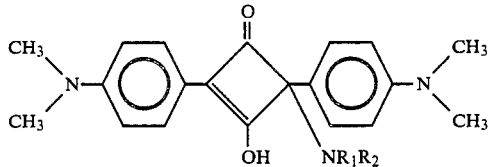

was formed within a few minutes to yield a red solution. $R_1$ was H and $R_2$ was $CH_2CH_2NH_2$. This solution was filtered and added to a cooled flask containing 2 liters of water. A neutralizing solution consisting of 85 grams $H_2SO_4$ (conc.) in 200 grams of water was thereafter prepared. With vigorous stirring, the acid solution was rapidly (5 sec.) added to the aqueous amine/squaraine solution. An immediate intense black/blue color was observed. The mixture was filtered using a medium fritted-glass funnel. The pH of the filtrate was adjusted between 2-3. After filtration, the moist cake was redispersed in 1.5 liters of water using a Waring blender and filtered. The water redispersion was repeated and filtered. The moist cake was dispersed in acetone and filtered. The moist cake was again dispersed in acetone and filtered. The blue pigment was dried in Vacuo at 50° C. Yield 18.1 g (90 percent). The precipitated pigment particles consisted of rod-like particles ranging from 0.5 μm–1.5 μm. These pigment particles were easily dispersed in a variety of solvents with or without polymer binders such as polycarbonate (Makrolon TM, available from Farbenfabriken Bayer AG), polyester (Vitel PE-100 TM and Vitel PE-200 TM, available from Goodyear Tire & Rubber Co.), polyester and polyvinylbutyral.

EXAMPLE II

A 1 liter four-necked round-bottomed flask equipped with a Dean-Stark trap, reflux condenser, pressure equalizing addition funnel, argon bleed tube and magnetic stir bar was charged with squaric acid (11.4 grams, 0.1 mole) and 1-heptanol (400 milliliters). The addition funnel was charged with 27 grams N,N-dimethyl-m-toluidine (0.2 mole) and 2.8 grams N,N-dimethyl-3-fluoroaniline (0.02 moles). The system was sealed and evacuated by mechanical pump to 40 Torr. When the pressure inside the reactor had reached equilibrium, the reactor was heated with a heating mantle to reflux (103° C.), for about 10 minutes. After exactly 15 minutes of reflux, the aniline mixture was added in one portion. The color of the solution changed from clear to green within 5 minutes of the addition of the aniline mixture. Refluxing was continued for 5.5 hours, when approximately 3 milliliters of water had collected in the Dean-Stark trap, at which time the reaction was terminated. The resulting product crystals were collected on a 10 mm Millipore TM filter and slurried twice with 2×350 milliliters of ethyl acetate. The yield was 58 percent. Twenty grams of this 2-(2-methyl-4-dimethylaminophenyl)-4-(2-fluoro-4-dimethylaminophenyl)squaraine pigment having a rod shape and a particle size ranging from 5 μm to 25 μm was added to a flask containing 50 grams of ethylene diamine purged with argon. An amine adduct believed to have the following structure:

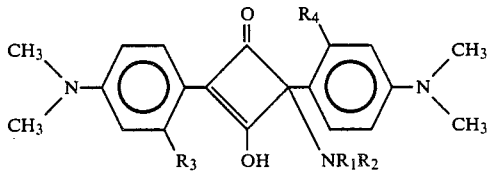

was formed within a few minutes to give a deep yellow solution. $R_1$ was H, $R_2$ was $CH_2CH_2NH_2$, and $R_3$ and $R_4$ were independently selected from methyl and fluorine. This solution was filtered and added to a cooled flask containing 2 liters of water. A neutralizing solution consisting of 85 grams $H_2SO_4$ (conc.) in 200 grams of water was thereafter prepared. With vigorous stirring, the acid solution was rapidly (5 sec) added to the aqueous amine/squaraine solution. An immediate intense black/blue color was observed. The mixture was filtered using a medium fritted-glass funnel. The pH of the filtrate was adjusted between 2 and 6. After filtration, the moist cake was redispersed in 1.5 liters of water using a Waring blender and filtered. The water redispersion was repeated and filtered. The moist cake was dispersed in acetone and filtered. The moist cake was again dispersed in acetone and filtered. The blue pigment was dried in Vacuo at 50° C. Yield 18.1 g (90 percent). The precipitated pigment particles consisted of rod-like particles ranging from 0.5 μm to 1.5 μm. These pigment particles were easily dispersed in a variety of solvents with or without polymer binders such as polycarbonate (Makrolon TM, available from Farbenfabriken Bayer AG), polyester (Vitel PE-200 TM and PE-200 TM, available from Goodyear Tire & Rubber Co.), and polyvinyl butyral.

EXAMPLE III

Into a 12,000 milliliter three-necked round bottom flask equipped with a mechanical stirrer, thermometer and a condenser with a Dean-Stark trap was placed 114 grams squaric acid (1 mole), 197 grams N,N-dimethylaniline (1.63 moles), 118 grams N,N-dimethyl-m-toluidine (0.87 mole) and 2 liters 2-ethyl-1-hexanol. A vacuum of 20 Torr was applied by means of a gas inlet connecting tube at the top of the condenser. The mixture was heated with stirring to reflux of 90° C. The water formed during the course of the reaction was allowed to collect in the Dean-Stark trap. After 24 hours, the reaction was allowed to cool and was filtered. The blue crystalline pigment was washed with methanol and dried in vacuo at 50° C. Yield of 2-(4-dimethylaminophenyl)-4-(2-methyl-4-dimethylaminophenyl) was 238 grams (73 percent). Twenty five grams of this squaraine pigment having a rod shape and a particle size ranging from 0.4 μm to 50 μm was added to a flask containing 75 grams of ethylene diamine purged with argon. The amine adduct was formed within a few minutes to give a red solution. This solution was filtered and added to a cooled flask containing 2 liters water. A neutralizing solution consisting of 130 grams concentrated sulfuric acid in 200 grams of water was thereafter prepared. With vigorous stirring, the neutralizing solution was rapidly (5 sec) added to the aqueous amine/squaraine solution. An immediate intense blue/black color was observed. The mixture was filtered using a medium fritted-glass funnel. The pH of the filtrate was 2.5. After filtration, the moist cake was redispersed in 1.5 liters of water using a Waring blender and filtered. The water redispersion was repeated and filtered. The moist cake was dispersed in acetone and filtered. The moist cake was again dispersed in acetone and filtered. The blue pigment was dried in vacuo at 50° C. Yield was 22.5 g (90 percent). The precipitated pigment particles consisted of rod-like particles ranging from 0.4 μm to 10 μm. These pigment particles were easily dispersed in a variety of solvents with or without polymer binders such as polycarbonate (Makrolon ™, available from Farbenfabriken Bayer AG), polyester (Vitel PE-200 ™ and PE-200 ™, available from Goodyear Tire & Rubber Co.), and polyvinyl butyral.

EXAMPLE IV

Into a 120,000 milliliter three-necked round bottom flask equipped with a mechanical stirrer, thermometer and a condenser with a Dean-Stark trap was placed 238 grams squaric acid, 456 grams N,N-dimethylaniline (3.77 moles), 168 grams N,N-dimethyl-m-toluidine (1.24 moles) and 4.8 liters 2-ethyl-1-hexanol. A vacuum of 20 Torr was applied by means of a gas inlet connecting tube at the top of the condenser. The mixture was heated with stirring to reflux at 90° C. The water formed during the course of the reaction was allowed to collect in the Dean-Stark trap. After 24 hours, the reaction was allowed to cool and was filtered. The blue crystalline pigment was washed with methanol and dried in vacuo at 50° C. Yield of 2-(4-dimethylaminophenyl)-4-(2-methyl-4-dimethylaminophenyl) was 453 grams (70 percent). Thirty grams of this squaraine pigment having a rod shape and a particle size ranging from 0.5 μm to 70 μm was added to a flask containing 90 grams of ethylene diamine purged with argon. The amine adduct was formed within a few minutes to give a red colored solution. This solution was filtered and added to a cooled flask containing 2 liters of water. A neutralizing solution consisting of 150 grams concentrated sulfuric acid in 200 grams of water was thereafter prepared. With vigorous stirring, the neutralizing solution was rapidly (5 sec) added to the aqueous amine/squaraine solution. An immediate intense blue/black color was observed. The mixture was filtered using a medium fritted-glass funnel. The pH of the filtrate was 2.3. After filtration, the moist cake was redispersed in 1.5 liters of water using a Waring blender and filtered. The water redispersion was repeated and filtered. The moist cake was dispersed in acetone and filtered. The moist cake was again dispersed in acetone and filtered. The blue pigment was dried in vacuo at 50° C. Yield was 26.5 grams (88 percent). The precipitated pigment particles consisted of rod-like particles ranging from 0.5 μm to 1.5 μm. These pigment particles were easily dispersed in a variety of solvents with or without polymer binders such as polycarbonate (Makrolon ™, available from Farbenfabriken Bayer AG), polyester (Vitel PE-200 ™ and PE-200 ™, available from Goodyear Tire & Rubber Co.), and polyvinyl butyral.

EXAMPLE V

A 1 liter four-necked round-bottomed flask equipped with a Dean-Stark trap, reflux condenser, pressure equalizing addition funnel, argon bleed tube and magnetic stir bar was charged with squaric acid (11.4 grams, 0.1 mole) and 1-heptanol (400 milliliters). The addition funnel was charged with 27 grams N,N-dimethyl-m-toluidine (0.2 mole) and 2.8 grams N,N-dimethyl-3-fluoroaniline (0.02 mole). The system was sealed and evacuated by mechanical pump to 40 Torr. When the pressure inside the reactor had reached equilibrium the reactor was heated with a heating mantle to reflux (103° C.), for about 10 minutes. After exactly 15 minutes of reflux, the aniline mixture was added in one portion. The color of the solution changed from clear to green within 5 minutes of the addition of the aniline mixture. Refluxing was continued for 5.5 hours, when approximately 3 milliliters of water had collected in the Dean-Stark trap, at which time the reaction was terminated. The resulting product crystals were collected on a 10 mm Millipore ™ filter and slurried twice with 2×250 milliliters of ethyl acetate. The yield was 58 percent. Twenty grams of this squaraine pigment having a rod shape and a particle size ranging from 5 μm to 40 μm was added to a flask containing 50 grams of ethylene diamine purged with argon. The amine adduct was formed within a few minutes to give a yellow solution. This solution was filtered and added to a cooled flask containing 2 liters of water. A neutralizing solution consisting of 83 grams concentrated sulfuric acid in 200 grams of water was thereafter prepared. With vigorous stirring, the neutralizing solution was rapidly (5 sec) added to the aqueous amine/squaraine solution. An immediate intense blue color was observed. The mixture was filtered using a medium fritted-glass funnel. The pH of the filtrate was 2.5. After filtration, the moist cake was redispersed in 1.5 liters of water using a Waring blender and filtered. The water redispersion was repeated and filtered. The moist cake was dispersed in acetone and filtered. The moist cake was again dispersed in acetone and filtered. The blue pigment was dried in Vacuo at 50° C. Yield was 18.1 grams (91 percent). The precipitated pigment particles consisted of rod-like particles ranging from 0.5 μm to 2 μm. These pigment particles were easily dispersed in a variety of solvents with or without polymer binders such as polycarbonate (Makrolon ™, available from Farbenfabriken Bayer AG), polyester (Vitel PE-200 ™ and PE-200 ™, available from Goodyear Tire & Rubber Co.), and polyvinyl butyral.

EXAMPLE VI

Into a three liter three-necked round bottom flask equipped with a mechanical stirrer, thermometer and a condenser with a Dean-Stark trap was placed 28.5 grams squaric acid (0.25 mole), 80 grams N,N-dimethyl aniline (0.66 mole) and 1250 milliliters 1-heptanol. A vacuum of 25 torr was applied via the condenser. The mixture was heated with stirring to reflux at 95° C. The water formed during the course of the reaction was allowed to collect in the Dean-Stark trap. After 24 hours, the reaction was allowed to cool and was filtered. The resulting blue crystalline pigment was washed with methanol and dried in vacuo at 50° C. Yield of bis(4-dimethylaminophenyl)squaraine was 55 gram (69 percent). Twenty grams of this Bis(4-dimethylaminophenyl)squaraine pigment having a rod shape and a particle size ranging from 5 μm to 20 μm was added to a flask containing 50 grams of ethylene diamine purged with argon. An amine adduct believed to have the following structure:

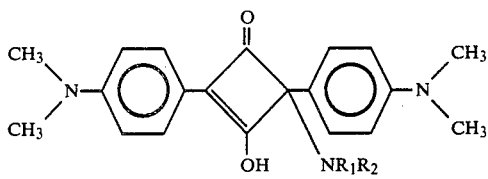

was formed within a few minutes to give a red solution. $R_1$ was H and $R_2$ was $CH_2CH_2NH_2$. This solution was filtered and added to a cooled flask containing 2 liters of water. A neutralizing solution consisting of 83 grams H2SO4 (conc.) in 200 grams of water was thereafter prepared. With vigorous stirring, the acid solution was rapidly (5 sec) added to the aqueous amine/squaraine solution. An immediate intense black-blue color was observed. The mixture was filtered using a medium fritted-glass funnel. The pH of the filtrate was 2.5. After filtration, the moist cake was redispersed in 1.5 liters of water using a Waring blender and filtered. The water redispersion was repeated and filtered. The moist cake was dispersed in acetone and filtered. The moist cake was again dispersed in acetone and filtered. The blue pigment was dried in Vacuo at 50° C. Yield 17.8 g (89 percent). The precipitated pigment particles consisted of rod-like particles ranging from 0.5 μm–1.5 μm. These pigment particles were easily dispersed in a variety of solvents with or without polymer binders such as polycarbonate (Makrolon TM, available from Farbenfabriken Bayer AG), polyester (Vitel PE-100 TM and Vitel PE-200 TM, available from Goodyear Tire & Rubber Co.), polyester, and polyvinyl butyral.

EXAMPLE VII

Into a 1000 liter three-necked round bottom flask equipped with a mechanical stirrer, thermometer and a condenser with a Dean-Stark trap was placed 11.4 grams squaric acid (0.1 mole), 33 grams N,N-dimethyl-3-fluoroaniline (0.24 mole) and 400 milliliters 1-heptanol. A vacuum of 36 torr was applied via the condenser. The mixture was heated with stirring to reflux at 100° C. The water formed during the course of the reaction was allowed to collect in the Dean-Stark trap. After 20 hours, the reaction was allowed to cool and was filtered. The resulting blue crystalline pigment was washed with methanol and dried in vacuo at 50° C. Yield of bis(2-fluorodimethylaminophenyl)squaraine was 23 grams, 59 percent. Seventeen grams of this squaraine igment was added to a flask containing 50 grams of ethylene diamine purged with argon. The amine adduct was formed within a few minutes to give a red solution. This solution was filtered and added to a cooled flask containing 2 liters of water. A neutralizing solution consisting of 86 grams concentrated sulfuric acid in 200 grams of water was thereafter prepared. With vigorous stirring, the neutralizing solution was rapidly (5 sec) added to the aqueous amine/squaraine solution. An immediate intense blue-black color was observed. The mixture was filtered using a medium fritted-glass funnel. The pH of the filtrate was 2.5. After filltration, the moist cake was redispersed in 1.5 liters of water using a Waring blender and filtered. The water redispersion was repeated and filtered. The moist cake was dispersed in acetone and filtered. The moist cake was again dispersed in acetone and filtered. The blue pigment was dried in vacuo at 50° C. Yield was 15 glrams (88 percent). The precipitated pigment particles consisted of rod-like particles ranging from 0.5 μm to 1 μm. These pigment particles were easily dispersed in a variety of solvents with or without polymer binders such as polycarbonate (Makrolon TM, available from Farbenfabriken Bayer AG), polyester (Vitel PE-100 TM and Vitel PE-200 TM, available from Goodyear Tire & Rubber Co.), polyester, and polyvinyl butyral.

EXAMPLE VIII

Into a three liter three-necked round bottom flask equipped with a mechanical stirrer, thermometer and a condenser with a Dean-Stark trap was placed 28.5 grams squaric acid (0.25 mole), 80 grams N,N-dimethyl aniline (0.66 mole) and 1250 milliliters 1-heptanol. A vacuum of 25 torr was applied via the condenser. The mixture was heated with stirring to refllux at 95° C. The water formed during the course of the reaction was allowed to collect in the Deak-Stark trap. After 24 hours, the reaction was allowed to cool and was filtered. The resulting blue crystalline pigment was washed with methanol and dried in vacuo at 50° C. Yield of bis(4-dimethylaminophenyl)squaraine was 55 grams (69 percent). This Bis(4-dimethylaminophenyl)squaraine pigment had a rod shape and a particle size ranging from 5 μm 20 μm. Into another three liter three-necked round bottom flask equipped with a mechanical stirrer, thermometer and a condenser with a Dean-Stark trap was placed 28.5 grams squaric acid (0.25 mole), 77 grams N,N-dimethyl-m-toluidine (0.57 mole) and 1250 milliliters 1-heptanol. A vacuum of 47 torr was applied via the condenser. The mixture was heated with stirring to reflux at 105° C. The water formed during the course of the reaction was allowed to collect in the Dean-Stark trap. After 7 hours, the reaction was allowed to cool and was filtered. The resulting green crystalline pigment was washed with methanol and dried in vacuo at 50° C. Yield of bis(2-methyl-dimethylaminophenyl)squaraine was 54 grams (64 percent). Twelve grams of Bis(4-dimethylaminophenyl)squaraine pigment and 8 grams of bis(2-methyl-dimethylaminophenyl)squaraine pigment were added to a flask containing 50 grams of ethylene diamine purged with argon. The amine adduct was formed within a few minutes to give a red solution. This solution was filtered and added to a cooled flask containing 2 liters of water. A neutralizing solution consisting of 85 grams of concentrated sulfuric acid in 200 grams of water was thereafter prepared. With vigorous stirring, the neutralizing solution was rapidly (5 sec) added to the aqueous amine/squaraine solution. An immediate intense blue-black color was observed. The mixture was filtered using a 15 cm medium fritted-glass funnel. The pH of the filtrate was 2.5. After filtration, the moist cake was redispersed in 1.5 liters of water using a Waring blender and filtered. The water redispersion was repeated and filtered. The moist cake was dispersed in acetone and filtered. The moist cake was again dispersed in acetone and filtered. The blue pigment was dried in vacuo at 50° C. Yield was 18.2 grams (91 percent). The precipitated pigment particles consisted of rod-like particles ranging from 0.5 μm to 1.5 μm. These pigment particles were easily dispersed in a variety of solvents with or without polymer binders such as polycarbonate (Makrolon ™, available from Farbenfabriken Bayer AG), polyester (Vitel PE-100 ™ and Vitel PE-200 ™, available from Goodyear Tire & Rubber Co.), polyester, and polyvinyl butyral.

EXAMPLE IX

Samples of the squaraine materials before and after treatment with the precipitation process of this invention described in Examples II through VII were used to prepare photoreceptors. These photoreceptors were prepared as follows. A siloxane layer was formed on an aluminized polyester film, Mylar ™, in which the aluminum had a thickness of about 150 Angstroms by applying a 0.22 percent (0.001 mole) solution of 3-aminopropyltriethoxysilane to the aluminum layer with a Bird applicator. The deposited coating was dried in a forced air oven to form a dried coating having a thickness of 200 Angstroms. About 0.075 gram of the before and after precipitation treatment squaraine pigment particles of Examples III through VIII were mixed in about 0.15 gram of a binder of polyester resin (Vitel PE-200 ™, available from Goodyear Tire & Rubber Co.) and sufficient methylene chloride to form a 15 percent solids mixture. This mixture applied by means of a Bird applicator having a 0.5 mil gap to the previously applied polyester resin coating to form a charge generating coating. After drying in a forced air oven for 5 minutes at temperature of 135° C., the dried coating was found to have a thickness of about 0.5 micrometer. This squaraine generating layer was then overcoated with a methylene chloride solution containing 15 percent solids, the solids containing about 50 percent by weight N,N'-diphenyl-N,N'-bis(3-methylphenyl)-1,1'-biphenyl-4,4'-diamine dispersed in about 50 percent by weight iof Makrolon ™ (polycarbonate resin available from Farbenfabricken Bayer A.G.) and then dried at 135° C. for 5 minutes. The charge transport layer had a thickness of 32 micron after drying. Electrical evaluation of the resulting coated devices charged to about −1000 to −1200 volts and exposed to 10 ergs of activating radiation at a wavelength of about 800 nanometers revealed the dark decay and sensitivity values set forth in Table 1 below:

TABLE 1

| | BEFORE PRECIPITATION | | AFTER PRECIPITATION | |
|---|---|---|---|---|
| Example | Dark Decay V/Sec | Sensitivity E½(ergs) | Dark Decay V/Sec | Sensitivity E½(ergs) |
| III | 30 | 7.5 | 20 | 5.0 |
| IV | 200 | 7.0 | 20 | 4.9 |
| V | 30 | 10.0 | 20 | 8.0 |
| VI | 400+ | — | 400+ | — |

TABLE 1-continued

| | BEFORE PRECIPITATION | | AFTER PRECIPITATION | |
|---|---|---|---|---|
| Example | Dark Decay V/Sec | Sensitivity E½(ergs) | Dark Decay V/Sec | Sensitivity E½(ergs) |
| VII | 400+ | — | 400+ | — |
| VIII* | — | — | 240 | — |

*Physical Mixture

The dark decay of photoreceptors prepared with the untreated squaraine particles of Examples III, IV and V were 50 percent to 950 percent higher than the photoreceptors prepared with the treated squaraines of Examples III, IV and V while the sensitivity iof the photoreceptors was maintained acceptable values. The dark decay of photoreceptors prepared with the squaraine particles of Examples VI, and VII remained high indicating that the reprecipitation technique did not prove useful for these intrinsically high dark decay pigments. Example VIII provides a control illustrating that the properties of unsymetrical squaraines is significantly different from a physical mixture.

Although the invention has been described with reference to specific preferred embodiments, it is not intended to be limited thereto, rather those skilled in the art will recognize that variations and modifications may be made therein which are within the spirit of the present invention and within the scope of the following claims.

We claim:

1. A process for forming finely divided squaraine particles comprising dissolving squaraine material in an organic base selected from the group consisting of primary organic amines and secondary organic amines, neutralizing said organic base with an acid selected from the group consisting of organic acids and inorganic acids thereby precipitating said squaraine material as finely divided particles in a liquid medium, and separating said finely divided particles from said liquid medium.

2. A process for forming finely divided squaraine particles according to claim 1 wherein said organic base is propylamine.

3. A process for forming finely divided squaraine particles according to claim 1 wherein said organic base is ethylenediamine.

4. A process for forming finely divided squaraine particles according to claim 1 wherein said squaraine material is dissolved in said organic base and said organic base is neutralized with sufficient acid to achieve an end point between about pH 2 and about pH 10.

5. A process for forming finely divided squaraine particles according to claim 4 wherein said squaraine material is dissolved in said organic base and said organic base is neutralized with sufficient acid to achieve an end point between about pH 2.5 and about pH 8.

6. A process for forming finely divided squaraine particles according to claim 1 wherein the solubility of said squaraine material in said organic base is at least 50 grams of said squaraine material per liter of said organic base.

7. A process for forming finely divided squaraine particles according to claim 1 comprising dissolving said squaraine material in said organic base to form a solution comprising between about 10 percent by weight and about 50 percent by weight of said squaraine material based on the total weight of said solution.

8. A process for forming finely divided squaraine particles according to claim 1 comprising dissolving said squaraine material in said organic base to form a saturated solution of said squaraine material.

9. A process for forming finely divided squaraine particles according to claim 1 wherein said finely divided squaraine particles have an average particle size less than about 2 micrometers.

10. A process for forming finely divided squaraine particles according to claim 1 wherein said squaraine material comprises an unsymetrical squaraine.

11. A process for forming finely divided squaraine particles according to claim 1 wherein said finely divided squaraine particles have greater xerographic sensitivity and lower dark decay than said squaraine material prior to treatment with said organic base and said acid.

* * * * *